US008024427B2

(12) United States Patent
Lawrence et al.

(10) Patent No.: US 8,024,427 B2
(45) Date of Patent: Sep. 20, 2011

(54) DYNAMIC STORAGE OF DOCUMENTS

(75) Inventors: Thomas R Lawrence, Seattle, WA (US); Andrew P Begun, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 794 days.

(21) Appl. No.: 11/328,291

(22) Filed: Jan. 9, 2006

(65) Prior Publication Data
US 2007/0162579 A1   Jul. 12, 2007

(51) Int. Cl.
*G06F 15/16*   (2006.01)
*G06F 15/167*  (2006.01)
*G06F 7/00*    (2006.01)
*G06F 17/00*   (2006.01)

(52) U.S. Cl. ........ 709/219; 709/206; 709/213; 707/610; 707/626; 707/628; 707/661; 707/667; 707/971; 707/972; 707/973; 707/974

(58) Field of Classification Search ........... 709/213, 709/219, 206; 715/744–745; 707/971–974, 707/610, 626, 628, 661–673
See application file for complete search history.

(56) References Cited

U.S. PATENT DOCUMENTS

| 5,987,506 | A * | 11/1999 | Carter et al. ............ 709/213 |
| 6,631,379 | B2 | 10/2003 | Cox |
| 6,635,088 | B1 | 10/2003 | Hind et al. |
| 6,850,948 | B1 | 2/2005 | Krasinski |
| 6,883,137 | B1 | 4/2005 | Girardot |
| 2002/0023159 | A1* | 2/2002 | Vange et al. ............ 709/228 |
| 2002/0161801 | A1 | 10/2002 | Hind et al. |
| 2002/0198743 | A1 | 12/2002 | Ariathurai et al. |
| 2003/0018466 | A1 | 1/2003 | Imaura |
| 2003/0126118 | A1* | 7/2003 | Burton et al. ............ 707/3 |
| 2004/0186851 | A1* | 9/2004 | Jhingan et al. ............ 707/104.1 |
| 2005/0027839 | A1* | 2/2005 | Day et al. ............ 709/223 |
| 2005/0182778 | A1 | 8/2005 | Heuer et al. |
| 2005/0268341 | A1 | 12/2005 | Ross |
| 2007/0143421 | A1* | 6/2007 | Vuong et al. ............ 709/206 |
| 2007/0162479 | A1 | 7/2007 | Begun et al. |

FOREIGN PATENT DOCUMENTS
WO   WO-2005067153   7/2005

OTHER PUBLICATIONS

A Performance and Appliance Approaches for XML Report: XML and Web Services at Wire-Speed [zapthink.com/report.html?id=ZTR-DI102].
Will Binary XML Solve XML Performance Woes? Zapflash. [zapthink.com/report.html?id=ZAPFLASH-11162004].
XML Sizing and Compression Study for Military Wireless Data [idealliance.org/papers/xml02/dx_xml02/papers/06-02-04/06-02-04.html].

* cited by examiner

*Primary Examiner* — Melanie Jagannathan
*Assistant Examiner* — Nicholas Jensen

(57) ABSTRACT

Various systems and techniques are disclosed relating to dynamic storage of documents. According to one or more exemplary systems and techniques, a location may be dynamically determined from a group of locations to store a state associated with a document based on one or more criteria.

20 Claims, 5 Drawing Sheets

DYNAMIC STORAGE OF DOCUMENTS

BACKGROUND

Documents are commonly exchanged or transmitted between devices over the Internet or other networks. Some languages, due to their data-intensive nature, may require significant resources to store and communicate documents. For example, XML (eXtensible Markup Language) or other languages may be used to exchange documents, e.g., between a browser and a server. When the browser returns to edit a document, this information may be retrieved and reloaded, edited, and then may be saved again for future processing. Thus, the processing and communication of documents may in some cases consume a significant amount of computer or memory resources to store the documents and may require significant network resources to communicate this information. In addition, the storage location of a document is typically a static decision. Even when conditions change, the document may typically be stored in the same location. This approach is typically unable to adapt to changing network conditions and may introduce further load on a system.

SUMMARY

Various embodiments are disclosed relating to dynamic storage of a document.

According to an example embodiment, a request may be received to process a document. The document may be processed based on the request. A location from a group of locations may be dynamically determined to store a state associated with the document based on one or more criteria. The locations to store the state may include, for example, a user device and a network device. The state may be stored at the determined location. In an example embodiment, the location to store the state may be determined based on one or more criteria or conditions, such as a connection speed for a user device and a size of the state. In an example embodiment, the request may include the state if the state is currently stored at the user device or browser, while the request may include a token or Cookie associated with the state if the state is stored on a device other than the user device.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1:
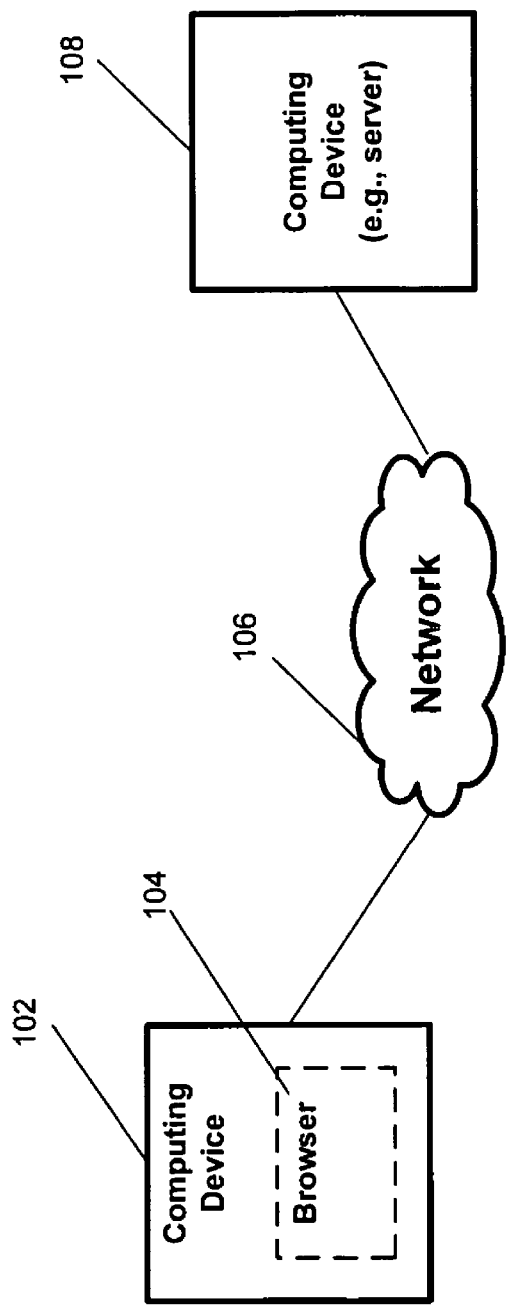
FIG. 1 is a block diagram of a system according to an example embodiment.

Referring to the Figures in which like numerals indicate like elements, FIG. 1 is a block diagram of a system according to an example embodiment. A computing device 102 may be coupled to a computing device 108 via a network 106. Computing devices 102 and 108 may be any type of computing device, such as a user device or a network device or other device. For example, network device 102 and 108 may each be a personal computer or PC, a handheld wireless device or cell phone, personal digital assistant or PDA, a server, a network resource such as a database, a switch or router, a proxy or agent, or other computing device. Each computing device may include, for example, a processor to execute software or instructions and provide overall control, memory, input/output device(s), a display, an operating system, and/or application software, although computing devices 102 and 108 may include a variety of additional common components or blocks.

According to an example embodiment, computing device 102 may be a user device (such as a PC or handheld device) and may include an application program, such as a browser 104. Computing device 108 may be, for example, a server. Computing devices 102 and 108 may communicate with each other via network 106, and may exchange information using one or more protocols, for example. The information exchanged by computing devices 102 and 108 may be provided in any format. In an example embodiment, information exchanged between computing devices 102 and 108 may include structured documents, such as XML (Extensible Markup Language) documents, although other structured documents may be used. XML is merely provided as an example, and the various embodiments are not limited thereto.

Figure 2:
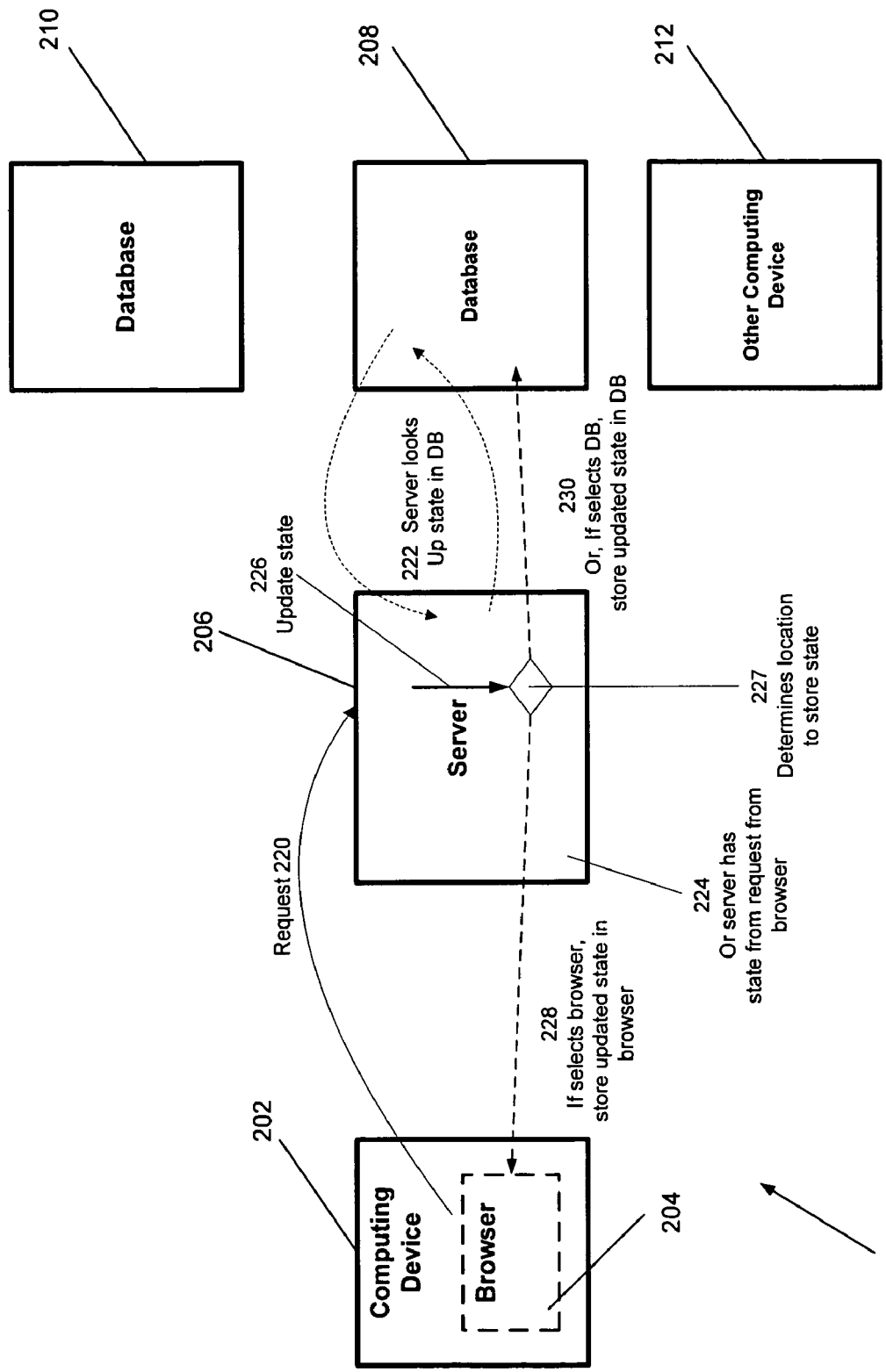
FIG. 2 is a block diagram of a system to dynamically determine a location to store a state, according to an example embodiment.

FIG. 2 is a block diagram of a system to dynamically determine a location to store a state, according to an example embodiment. System 200 may include a computing device 202, such as a user computing device (e.g., PC, laptop, wireless device) which may include a browser 204 (such as, for example, a web browser) to allow documents to be edited and exchanged with other devices. A server 206 may be coupled to computing device 202, e.g., either directly or via a network (not shown). Server 206 may be (or may include) a processing device or other computing device, and may receive and process requests, update documents, and/or perform other types of processing. One or more network devices may be coupled to server 206, e.g., either directly or via a network (not shown), such as, for example, a database 208, a database 210, and computing device 212. Databases 208 and 210 may be provided on a computing device (e.g., either the same computing device or separate computing devices).

As noted, computing device 202 may be coupled to server 206 via a network (not shown), and server 206 may be coupled to databases 208 and 210 and computing device 212 via a network (not shown). These networks are not shown to simplify the system in an example embodiment. These networks may be the same network, or different networks, for example. Each of these networks may be any type of network, such as, for example, one or more of a Local Area Network (LAN), a Wide Area Network (WAN), a wireless network, the Internet, or other type of network.

A state may be associated with a document. A document may be any set of data or information, and may contain any type of data, such as a web page, a form, an XML document, or other document. The state associated with the document may include a number of different types of data that may be used to process and display the document. A state, for example, may include data provided in the document, presentation information (e.g., information relating to how the data or document may be presented or displayed, user interface information and the like), meta information related to the document such as a name of a file or database where the state may be stored, and possibly other types of data or information.

According to an example embodiment, a state may be stored in one or more different locations. For example, a state for a document may be stored in browser 204 (e.g., within memory of a user device or computing device 202), on server 206, and/or on one or more of databases 208, 210 or other devices such as computing device 212.

In an example embodiment, a user may edit a document using browser 204 on computing device 202. The user may edit or change information in the document, for example, which may require server 206 to process the document, such as changing the view of the data, or other processing. Therefore, browser 204 may send a request at 220 to server 206 to process the document. The request may include, for example, presentation information for the document, a command to edit or process the document, and possibly a portion of the data or state (e.g., but typically not the entire state). The request from browser 204 may also include a token (such as a cookie or other token) to identify the state if the state is stored at a location other than the user computing device 202 (or browser 204). In another example embodiment, if the state is stored on the browser 204 (or within user computing device 202), then the request may include the state.

In an example embodiment, the request at 220 to process the document may include presentation information and a token (e.g., if state is stored at a location other than browser or user application). Alternatively, the request may include the state, including, for example, presentation information and complete data for the document (e.g., if the state is stored at the browser or user application). In addition, in an example embodiment, the request may also include a storage identifier, which may include:

a status field—indicating whether a token (or cookie) or the state is included in the request.
  0—token (or cookie) included (e.g., to identify the state for the document)
  1—state included
a location field—identifying where the state for the document is currently stored. The location field may provide an identifier indicating whether the document is stored in a user device or other device, and also a network address or identifier where the state is currently stored. The location field, may, for example, identify that the state is stored at:
  Browser (or stored at the requesting application or device)
  Server
  Database 1
  Database 2, etc.

In example embodiment, the storage identifier (e.g., including status field and location field) may alternatively be included as part of the state and/or included with the token or cookie and/or included with the presentation information for the document.

After receiving the request (e.g., at 220), the server 206 may then obtain the state. For example, at 222 (FIG. 2), server 206 may look up or retrieve the state from another device (e.g., network device) that is currently storing the state, such as from database 208, for example, if the state is not stored at the browser. This may include, for example, at 222, a request for the state sent from server 206 to database 208, and a reply from database 208 including the requested state. However, at 224, if the state is stored in browser 204 (or other user application), then the server 206 may, for example, obtain the state from the request (via 220), or in one or more separate messages from the browser 204. At 226, server 206 may perform the requested processing on the document and update the state.

Next, at 227, server 206 may determine a location to store the state. This new or updated location may the same as or different from its current storage location. In an example embodiment, server 206 may dynamically determine a location to store the state based on a variety of conditions or criteria. Therefore, server 206 may measure or determine a number of criteria or current conditions to make this location determination. In an example embodiment, server 206 may dynamically (e.g., based on current conditions or criteria) determine a location to store the state for the document based on a network connection speed for the user computing device and/or a size of the state. Other criteria or conditions may be used as well to determine a location for the state, such as a connection speed for server 206 to database 208, database 210 or other device, priority of the user or application, etc.

According to an example embodiment, if the state is relatively small, and/or the user computing device connection speed is relatively fast, then server may decide to store the state in browser 204, since the state may be transferred between browser 204 and server 206 relatively quickly, and this may avoid server 206 from obtaining the state from a network device such as database 208. Thus, in some cases, network resources and/or bandwidth may be conserved between server 206 and database 208, and memory resources may be conserved at database 208, if state is stored at browser 504.

On the other hand, if the state is relatively large (or becomes large) and/or the user computing device connection speed is relatively slow, then server 206 may store the state on a network device, such as database 208 (or other device). This may decrease the burden (e.g., memory storage and network bandwidth usage) and latency experienced by user computing device 202, for example.

In an example embodiment, if the state is currently stored at browser 204 of user computing device 202, and then the user adds a significant amount of data to the document (and state), this may increase the size of the state such that it exceeds a threshold size. For example, when the size of the state is greater than this threshold size, this may cause server 206 to change the storage location for the state from browser 204 to database 208. In an example embodiment, server 206 may change the value of the storage identifier for the state, e.g., changing the status field to now indicate that a token is (or will be) provided to browser 204 (instead of state) and used to identify the state, and change a location field to indicate that the state is now stored at database 208, for example. This example is merely one illustration of how a location determination may be made dynamically to reflect new or changing conditions or criteria.

Next the server may store the updated state in the determined location (228, 230). For example, at 228, if the browser 204 is selected as the storage location for the state, server 206 may send one or more messages, e.g., as a response to request 220, to browser 204 to store the updated state at browser 204 (or at computing device 202). This response to browser 204 may include the state and the storage identifier, for example (e.g., having a status field indicating state included and a location field indicating state stored in browser or user computing device).

At 230, if a network device (such as database 208), or other device other than the user computing device (for example), is selected to store the state, then server 206 may send one or more messages to store the updated state in database 208, for example. The server may then send a response to browser 204 including the updated presentation information (e.g., a portion of the state impacted by the update and/or some presentation information) for the document or state, the token or Cookie for the state, and the updated storage identifier (e.g., having a status field indicating token included and a location field indicating state stored in a network device or database 208).

Figure 3:
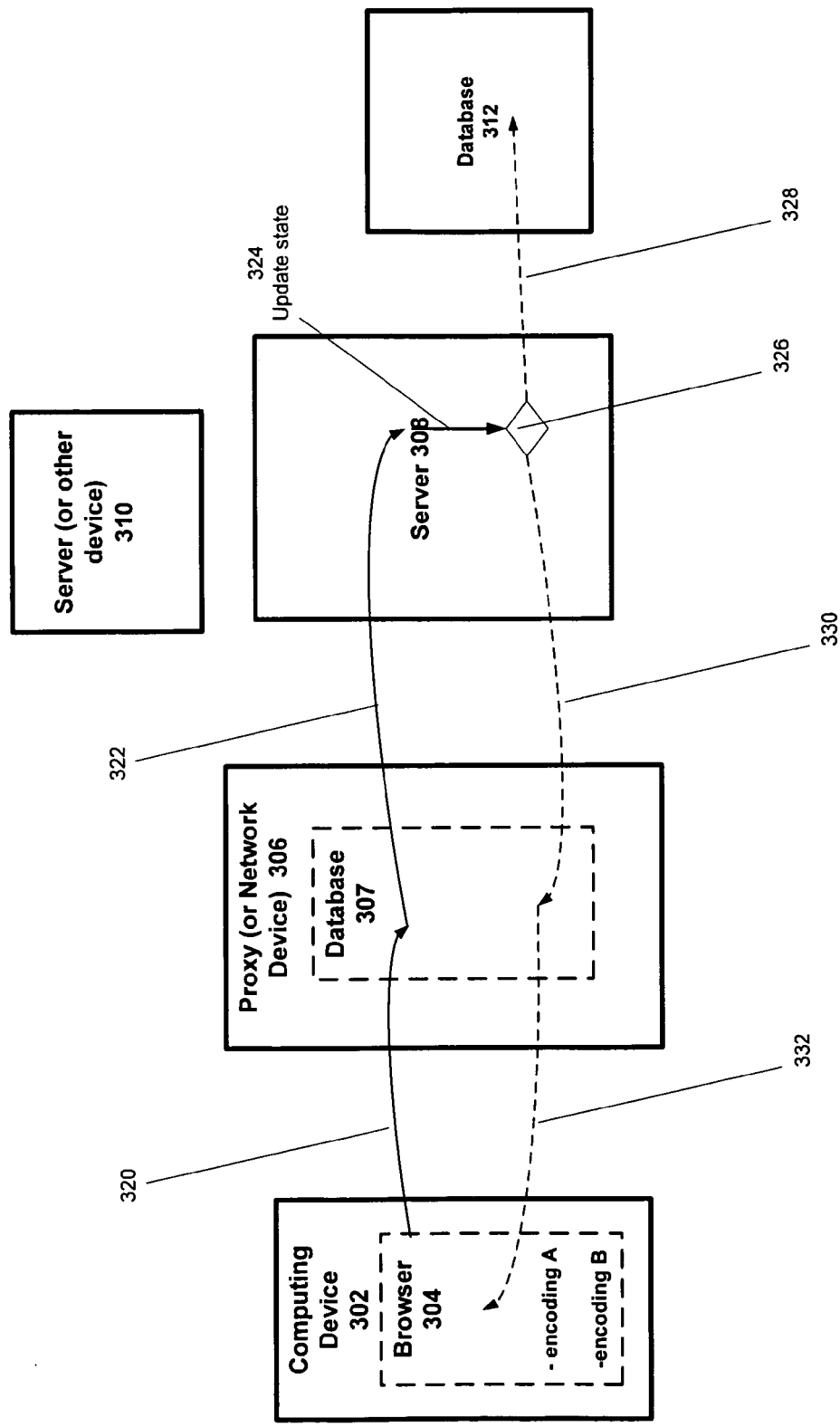
FIG. 3 is a block diagram of a system to dynamically determine a location to store a state, according to another example embodiment.

FIG. 3 is a block diagram of a system 300 to dynamically determine a location to store a state, according to another example embodiment. System 300 may include a computing device (e.g., user computing device) 302 that includes a browser 304. A proxy (or agent) 306 may be coupled (e.g., directly or via a network) to computing device 302. Proxy 306 may at times operate as an agent or representative for browser 304 or computing device 302, according to an example embodiment. Proxy 306 may include a database 307 to store information.

A server 308 (or other processing device) may be coupled (e.g., directly or via a network) to proxy 306 and to computing device 302/browser 304. Other servers or network devices may be provided as well, such as server 310. One or more databases or other network devices, such as database 312, may be coupled (e.g., directly or via a network) to server 308.

According to an example embodiment, a user may be editing a document on browser 304, and may send a request at 320 to server 308 to process the document. In an example embodiment, the state may be stored in database 307 (of proxy 306). In this example, the request to process the document may include one or more of a command or request to edit or process the document, a token or cookie, presentation information for the document, and the storage identifier (e.g., having a status field indicating token and a location field indicating browser), for example.

This request may be, for example, received or intercepted by proxy 306. The proxy 306 may use the token to identify or lookup the state stored in database 307. Although not required of course, in an example embodiment, proxy 306 may correct or change the storage identifier so that the status field now indicates state included and location field now indicates state stored at browser. At 322, proxy 306 may then forward the request to process the document (including the command or request to edit or process the document and the corrected storage identifier), along with the state, to server 308 for processing.

At 324, the server 308 may process the document as requested and then update the state. At 326, server 308 may (e.g., dynamically) determine a location to store the state based on one or more conditions or criteria. If a network device such as database 312 is selected to store the state, then at 328 the state is stored in database 312. A response may be sent to browser 304 (e.g., via proxy 306).

If browser 304 is determined to store the state, then server 308 may send a response at 330 to browser 304 including the state and storage identifier, token, etc. According to an example embodiment, this response may be received by proxy 306 on behalf of (or as a proxy or agent for) browser 304. Proxy 306 may store the state in database 307, correct the storage identifier (e.g., so that status field indicates token included and location field indicates state stored in a network device or non-user device). Proxy 306 may then send a modified response at 332 including one or more of, for example, presentation information for the document, the token or Cookie and the corrected storage identifier.

The system shown in FIG. 3 may allow a state to be stored at one of a plurality of user device proxies or agents. For example, if the connection speed between the computing device 302 and the network is relatively slow, and the connection speed between server 308 and database 307 is relatively slow (or network resources at the databases are already burdened), it may be advantageous for server 308 to select a proxy for the browser as the storage location, and allow the proxy to store the state and forward requests and responses between browser 304 and server 308. Although only one proxy is shown, there may be multiple proxies, with one or more proxies possibly being available for each user device or browser, for example.

Figure 4:
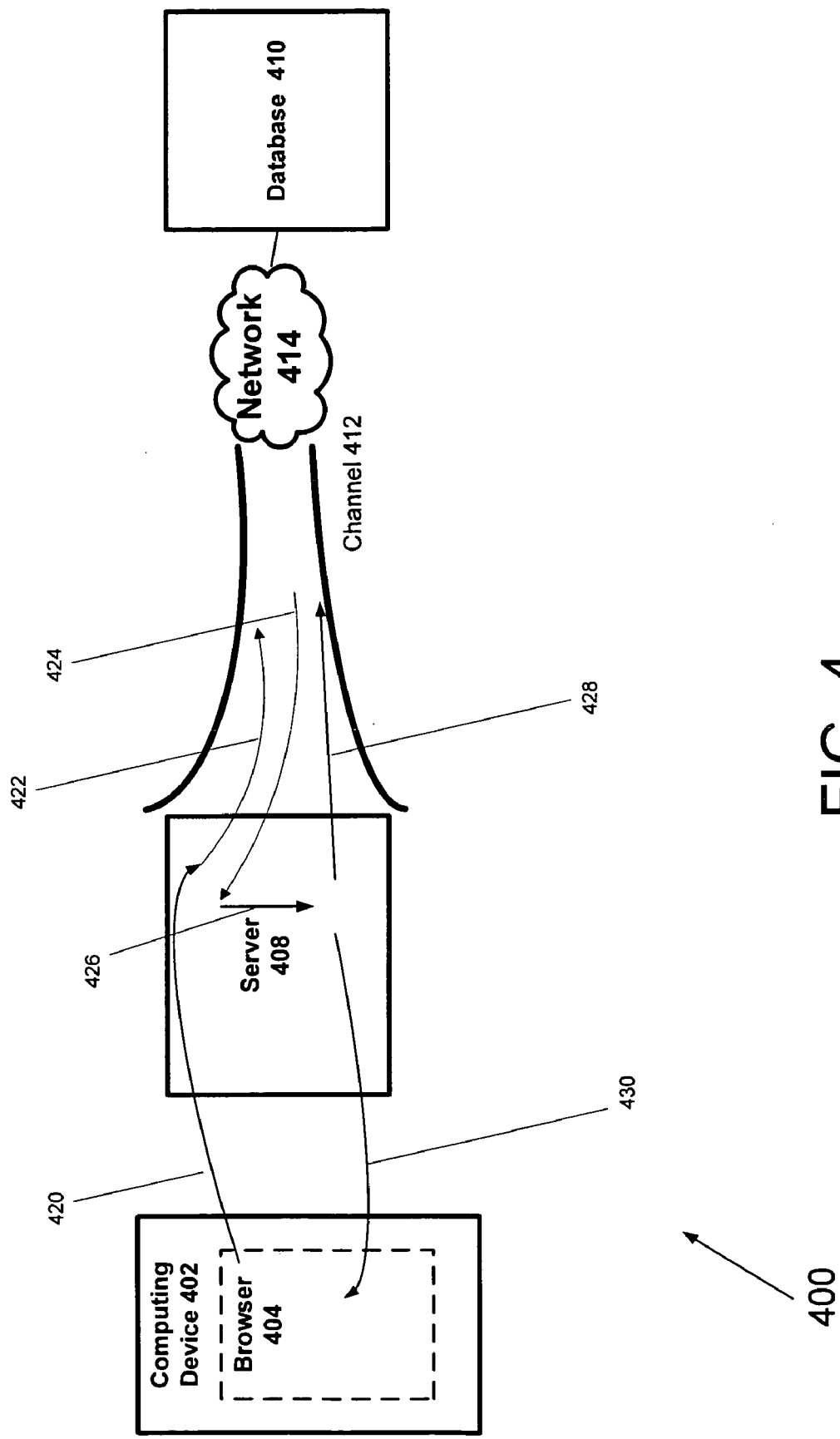
FIG. 4 is a block diagram of a system to dynamically determine a location to store a state, according to yet another example embodiment.

FIG. 4 is a block diagram of a system 400 to dynamically determine a location to store a state, according to yet another example embodiment. System 400 may include a computing device 402, which may include a browser 404 or other user application. A server 408 may be coupled to computing device 402 browser 404 (e.g., directly or via a network not shown).

Server 408 may also be coupled to a channel 412. Channel 412 may provide a mechanism to allow server 408 to submit requests and receive responses, and channel 412 may perform different types of data processing. Channel 412 may, for example, encapsulate or hide some of the specific details (e.g., from server 408) of where and how a state may be stored, etc. Channel 412 may be implemented, for example, as one or more of a server(s), network computing device(s) or other equipment that may assist in processing information, storing state for various documents, and/or providing information or responses to server 408. Channel 412, for example, may be coupled to a database 410. In an example embodiment, channel 412 may be coupled to a database 410 via a network 414.

According to an example embodiment, a user may be editing a document using browser 404 or other application. Browser 404 may submit a request at 420 to process the document.

In response to the request, at 422, server 408 may request channel 412 for the state. Channel 412 may then obtain the state, from where ever it may be stored and may provide the state to server 408 at 424. For example, if state is stored in databse 410, then channel 412 may retrieve it from database 410; if state is stored in another location or in browser 404, then channel 412 may obtain the state from such location.

Server 408 may then process the document (state) as requested at 426. The updated state may then provided to the channel at 428, and server 408 may ask the channel 412 to store the updated state. Channel 412 may then store the state in a device (e.g., either the same storage device as before, or a different storage device/location).

According to an example embodiment, channel 412 may determine a location to store the state, e.g., dynamically, based on one or more conditions or criteria, as described above. The channel 412 may then store the state in the selected location.

Server 408 may send a response at 430 to the browser 404. If channel 412 selects a device other than browser 404 to store the state, the response sent to browser 404 may include, for example, presentation information, a token or cookie for the state and a storage identifier. If the channel 412 selects browser 404 to store the state, then the response at 430 may include the state.

Thus, the channel 412, according to an example embodiment, may keep track of where the state is stored, and may interface with one or more devices to obtain the state and/or store the state in the same device/location or in a new device/location on behalf of or at the request of server 408. Channel 412 may generalize or hide one or more of these details from server 408, thus, for example, offloading some of this processing, etc. from server 408 to another device within channel 412.

Figure 5:
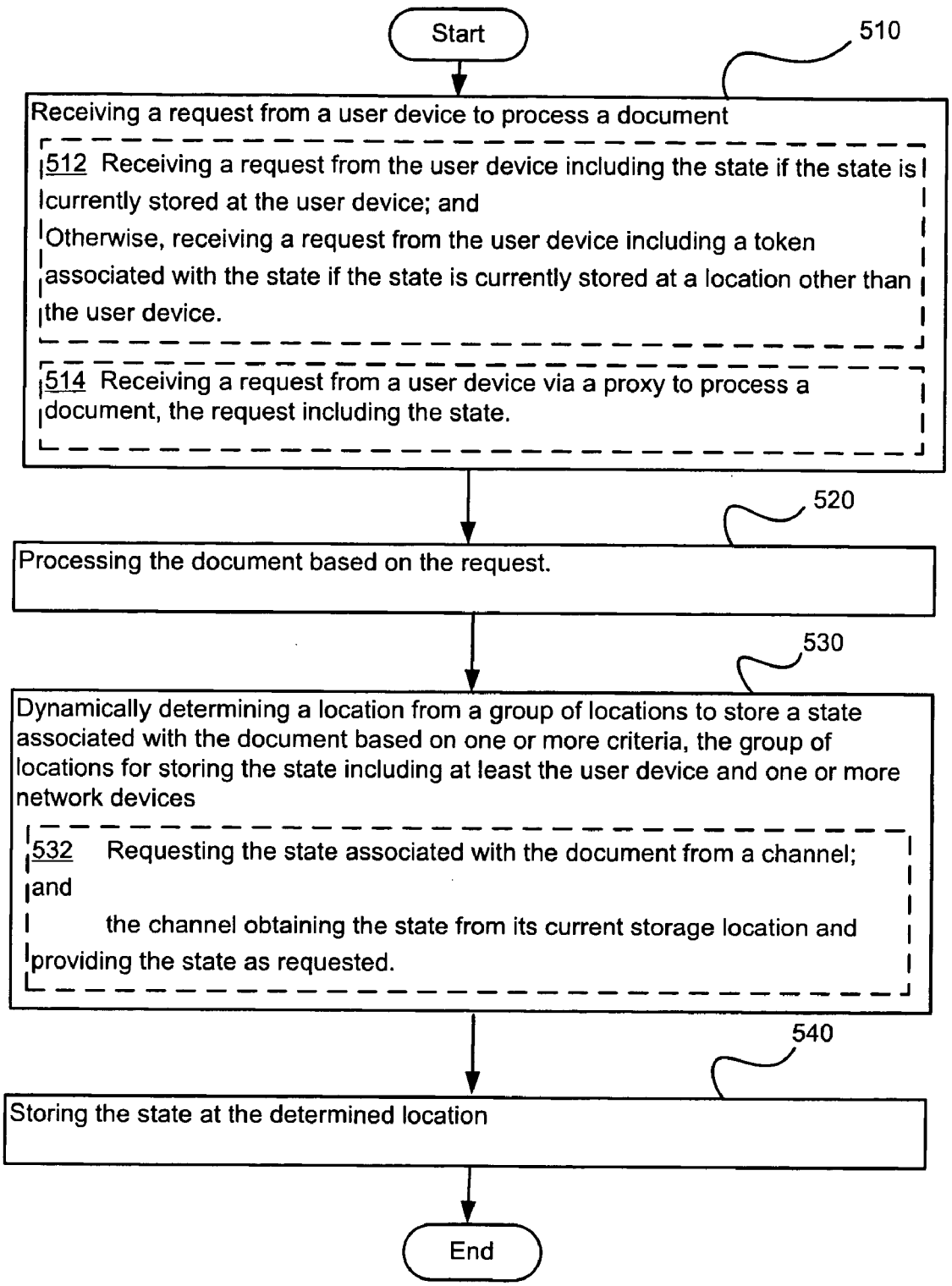
FIG. 5 is a flow chart illustrating operation of a system according to another example embodiment.

FIG. 5 is a flow chart illustrating operation of a system according to another example embodiment. At 510, a request to process a document may be received from a user device. This may include, for example, at 512, receiving a request from the user device including the state if the state is currently stored at the user device. Otherwise, receiving a request from the user device including a token associated with the state if the state is currently stored at a location other than the user device. In another example embodiment, this may include receiving a request to process a document from a user device via a proxy, the request including the state, 514.

At 520, the document may be processed based on the request. At 530, location may be dynamically determined from a group of locations to store a state associated with the document based on one or more criteria, the group of locations for storing the state including at least the user device and one or more network devices. In an example embodiment, this may include requesting a state associated with the document from a channel, and the channel obtaining the state from its current storage location and providing the state as requested. At 540, the state may be stored at the determined location.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A tangible computer-readable storage medium that does not consist of a signal, said computer-readable storage medium storing executable computer program instructions that, when executed, cause a computer to perform a computer-implemented method comprising:

receiving a request at a server from a browser of a computing device of a user, the request including a command to process a web page form document that was edited by the user using the browser, a storage identifier identifying a current storage location of a state associated with the web page form document, one of the state or a cookie identifying the state, and a status field indicating whether the state or the cookie identifying the state is included in the request;

obtaining, by the server, the state associated with the web page form document from the current storage location, the state associated with the web page form document comprising data provided in the web page form document, presentation information for displaying the web page form document, and meta information indicating where the state associated with the web page form document may be stored;

processing the web page form document at the server based on the state associated with the web page form document and the command included in the request, wherein the processing adds data to the web page form document;

adding data to the state associated with the web page form document based on the processing to provide an updated state associated with the web page form document;

determining that a size of the updated state associated with the web page form document exceeds a threshold size to store the updated state in the current storage location;

dynamically determining an updated storage location to store the updated state associated with the web page form document based on criteria including a connection speed of the computing device and the size of the updated state, wherein the updated storage location is selected from a group of storage locations at one or more network devices;

storing the updated state on a network device at the updated storage location; and sending a response to the request to the browser of the computing device of the user, the response comprising a token to be used by the browser for identifying the updated state and an updated storage identifier identifying the updated storage location where the updated state is stored.

2. The computer-readable storage medium of claim 1, wherein the network device at the updated storage location comprises a proxy for the browser.

3. The computer-readable storage medium of claim 1, wherein the response further comprises updated presentation information for displaying the web page form document processed by the server.

4. The computer-readable storage medium of claim 1, wherein the request includes the state if the state is currently stored at the computing device of the user or the browser.

5. The computer-readable storage medium of claim 1, wherein the request from the browser of the computing device of the user is received at a server via a proxy.

6. The computer-readable storage medium of claim 1, wherein obtaining the state comprises:
   requesting the state associated with the web form document from a channel; and
   receiving the state from the channel.

7. The computer-readable storage medium of claim 6, wherein the channel retrieves the state from the browser of the computing device of the user.

8. The computer-readable storage medium of claim 1, further comprising executable computer program instructions for:
   initially storing the updated state at the updated storage location;
   determining that one or more of the criteria have changed; and
   storing the updated state at a new storage location different from the updated storage location based on the determining.

9. The computer-readable storage medium of claim 8 further comprising executable computer program instructions for:
   determining that the size of the updated state has increased to be greater than a threshold size to store the updated state on the network device at the updated storage location;
   storing the updated state at a different network device; and
   providing a new token to be used by the browser for identifying the updated state of the web form document and a new storage identifier identifying the new storage location where the updated state is stored to the browser of the computing device of the user.

10. The computer-readable storage medium of claim 1 further comprising executable computer program instructions for:
   determining that the size of the updated state exceeds a threshold size to store the updated state in the browser of the computing device of the user.

11. A tangible computer-readable storage medium that does not consist of a signal, said computer-readable storage medium storing executable computer program instructions that, when executed, cause a computer to perform a computer-implemented method comprising:
   receiving a request at a server from a browser of a computing device of a user, the request including a command to process a web page form document that was edited by the user using the browser, a storage identifier identifying a current storage location of a state associated with the web page form document, one of the state or a cookie identifying the state, and a status field indicating whether the state or the cookie identifying the state is included in the request;
   obtaining, by the server, the state associated with the web page form document from the current storage location, the state associated with the web page form document comprising data provided in the web page form document, presentation information for displaying the web page form document, and meta information indicating where the state associated with the web page form document may be stored;
   processing the web page form document at the server based on the state associated with the web page form document and the command included in the request, wherein the processing adds data to the web page form document;
   adding data to the state associated with the web page form document based on the processing to provide an updated state associated with the web page form document;
   determining that a size of the updated state associated with the web page form document exceeds a threshold size to store the updated state in the current storage location;
   dynamically determining an updated storage location to store the updated state associated with the web page form document based on criteria including a connection speed of the computing device and the size of the updated state, wherein the updated storage location is selected from a group of storage locations at one or more network devices;
   storing the updated state at the updated storage location;
   sending a response to the request to the browser of the computing device of the user, the response comprising a token to be used by the browser for identifying the updated state and an updated storage identifier identifying the updated storage location where the updated state is stored;
   detecting a change in one or more of the criteria;
   storing the updated state at a new storage location different from the updated storage location; and
   sending to the browser of the computing device of the user a new storage identifier identifying the new storage location where the updated state is stored.

12. The computer-readable storage medium of claim 11 further comprising executable computer program instructions for dynamically determining the new storage location based on whether the size of the updated state exceeds a threshold size to store the updated state in the browser of the computing device.

13. An apparatus comprising:
   a processing device executing computer-executable program instructions stored in one or more memory devices on a computer causing the processing device to:
   receive a request at a server from a browser of a computing device of a user, the request including a command to process a web page form document that was edited by the user using the browser, a storage identifier identifying a current storage location of a state associated with the web page form document, one of the state or a cookie identifying the state, and a status field indicating whether the state or the cookie identifying the state is included in the request;

obtain the state associated with the web page form document from the current storage location, the state associated with the web page form document comprising data provided in the web page form document, presentation information for displaying the web page form document, and meta information indicating where the state associated with the web page form document may be stored;

process the web page form document at the server based on the state associated with the web page form document and the command included in the request, wherein processing the web page form document adds data to the web page form document;

add data to the state associated with the web page form document based on the processing of the web page form document to provide an updated state associated with the web page form document;

determine that a size of the updated state associated with the web page form document exceeds a threshold size to store the updated state in the current storage location;

dynamically determine an updated storage location to store the updated state associated with the web page form document based on criteria including a connection speed of the computing device and the size of the updated state, wherein the updated storage location is selected from a group of storage locations at one or more network devices;

store the updated state on a network device at the updated storage location; and send a response to the request to the browser of the computing device of the user, the response comprising a token to be used by the browser for identifying the updated state and an updated storage identifier identifying the updated storage location where the updated state is stored.

14. The apparatus of claim 13, wherein the network device at the updated storage location comprises a proxy for the browser.

15. The apparatus of claim 13, wherein the processing device receives the request from the browser of the computing device of the user via a proxy.

16. The apparatus of claim 13, wherein the request includes the state if the state is currently stored at the computing device of the user or the browser.

17. The apparatus of claim 13, wherein the request includes the cookie identifying the state if the state is not currently stored at the computing device of the user or the browser.

18. The computer-readable storage medium of claim 11, wherein the request includes the state if the state is currently stored at the computing device of the user or the browser.

19. The computer-readable storage medium of claim 11, wherein the request includes the cookie identifying the state if the state is not currently stored at the computing device of the user or the browser.

20. The computer-readable storage medium of claim 1, wherein the request includes the cookie if the state is not currently stored at the computing device of the user or the browser.

* * * * *